UNITED STATES PATENT OFFICE.

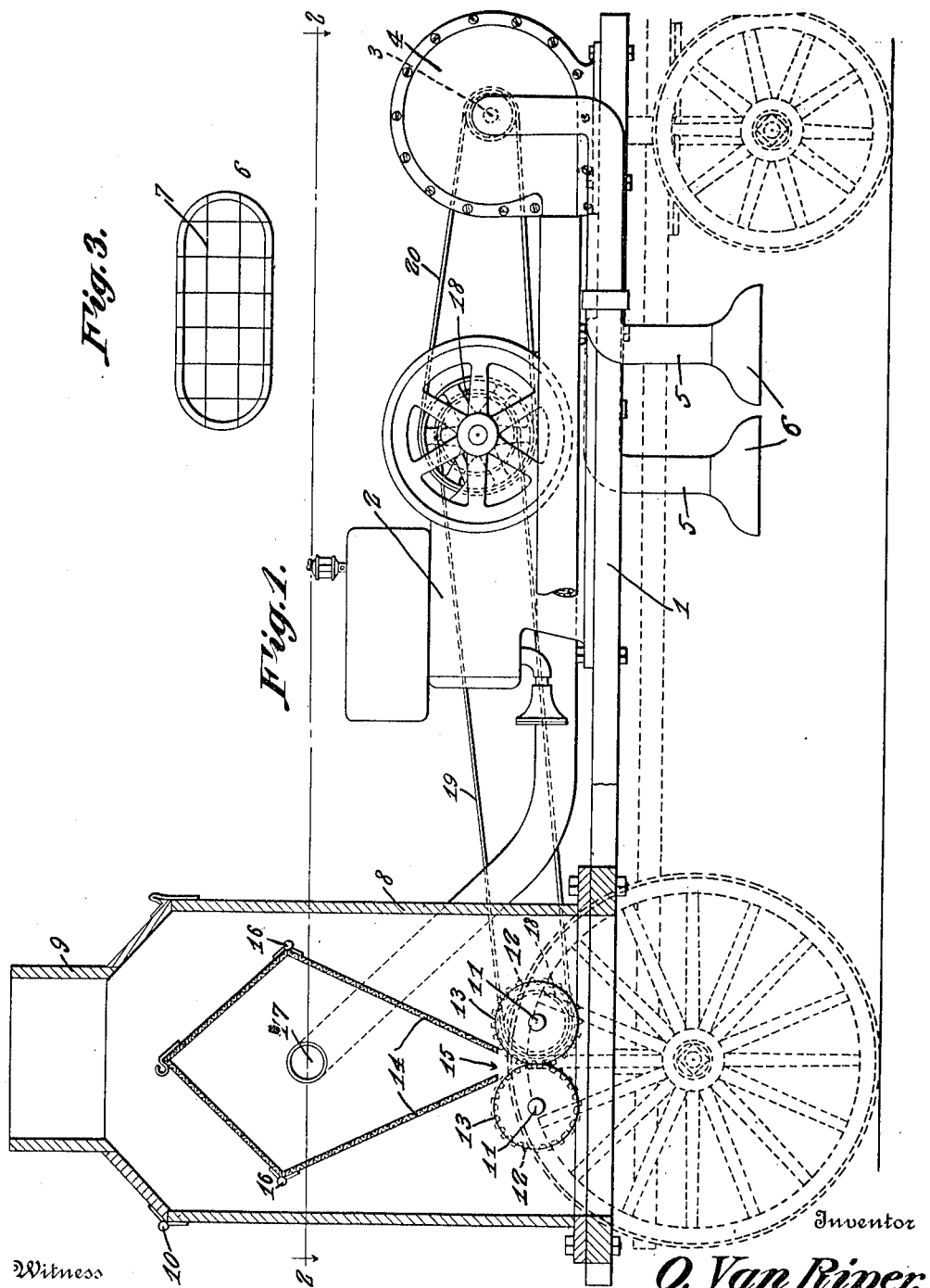

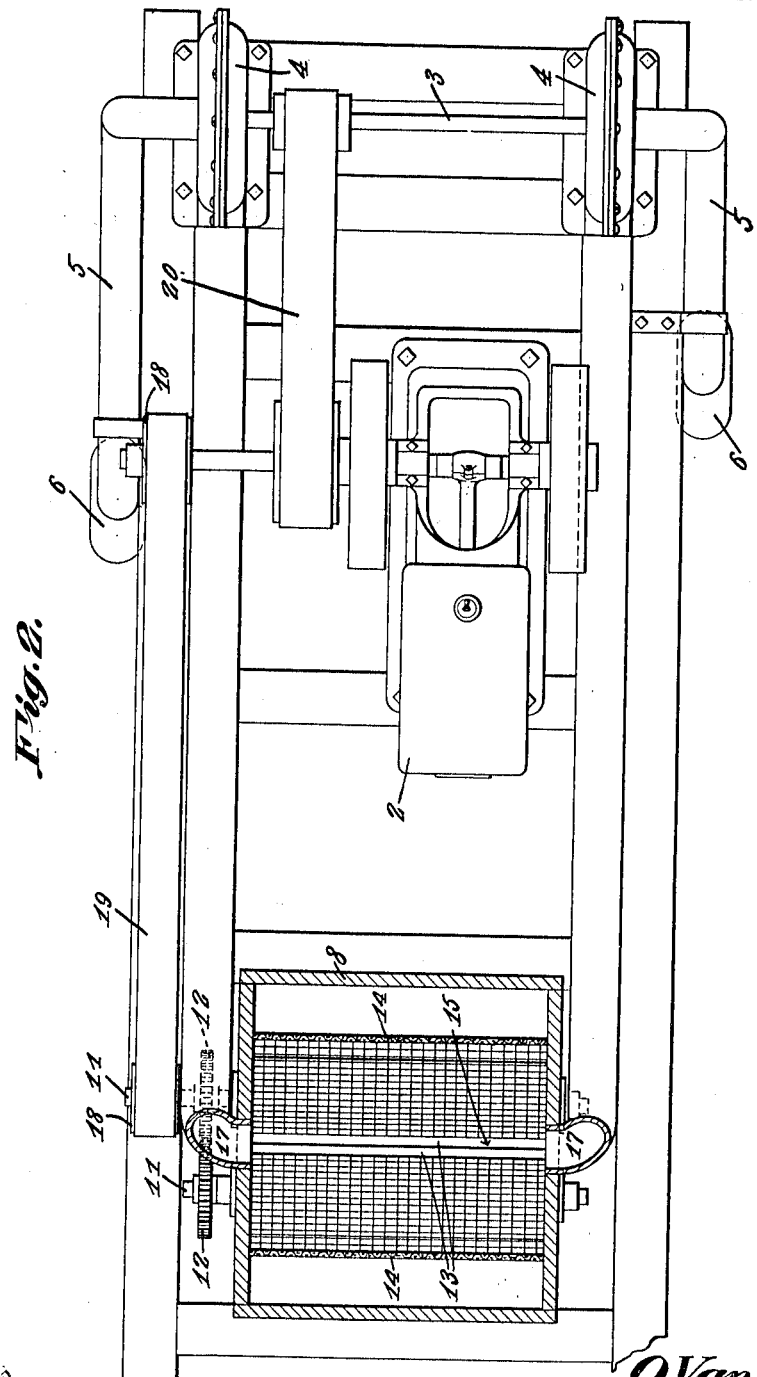

OSCAR VAN RIPER, OF HOPE, ARKANSAS.

BOLL-WEEVIL CATCHER.

1,309,556. Specification of Letters Patent. Patented July 8, 1919.

Application filed April 30, 1918. Serial No. 231,635.

*To all whom it may concern:*

Be it known that I, OSCAR VAN RIPER, a citizen of the United States, residing at Hope, in the county of Hempstead and State of Arkansas, have invented a new and useful Boll-Weevil Catcher, of which the following is a specification.

This invention relates to machines for catching and destroying boll weevils and other like insects, one of its objects being to provide a machine of this character which can be drawn over a field between rows of plants and will pick up and destroy the insects, punctured squares, and the like, dropping the material, after being subjected to treatment, onto the ground where it can be turned under and used as a fertilizer.

Another object is to provide a machine of this character which is motor propelled and which is compact in construction.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings

Figure 1 is a side elevation, a portion being shown in section.

Fig. 2 is a view partly in plan and partly in section.

Fig. 3 is a bottom plan view of one of the suction nozzles.

Referring to the figures by characters of reference 1 designates the frame of the machine which is to be mounted on the chassis of a motor vehicle or which can, if preferred, be arranged on the running gear of any other kind of vehicle. This frame has a motor 2 secured thereon and journaled on the rear portion of the frame is a transverse shaft 3 adapted to drive fans located in casings 4 arranged at the rear end of the frame on the side portions thereof. Connected to the central air inlet of each of the casings 4 is a tube 5 which extends laterally and downwardly, as shown particularly in Fig. 1, the lower ends of the tubes being provided with suction hoods or the like, shown at 6 and the lower ends of which are preferably provided with screens, as shown at 7.

Arranged on the frame 1, preferably at one end, is a casing 8 having an air outlet flue 9 at the top thereof, the top portion of the casing, together with the flue thereon, being hingedly mounted, as at 10, so that said top can be swung open to give access to the interior of the casing and enable it to be readily cleaned.

Parallel transverse shafts 11 are journaled in the lower portion of the casing 8 and have meshing gears 12 whereby motion is transmitted from one to the other. Crushing rolls 13 are secured to these shafts. Downwardly converging screens 14 are secured in the casing to form a hopper, the lower ends of the screens being spaced apart, as at 15, thus to discharge material into the pass between the rolls 13. Hinged covers of foraminous material are connected to the screens, as shown at 16 and are adapted to be secured in closed position in any manner desired.

Opening into the sides of the casing 8 so as to discharge into the space formed between the screens 14 are flues 17 extending from the outlets of the fan casings 4. Any suitable mechanism, such as pulleys 18 and a belt 19, is used for transmitting motion to the rolls 13 from the engine 2 and similar mechanism, shown at 20, can be employed for transmitting motion from the engine to the shaft 3.

In using the device it is placed on a movable supporting structure, such as the running gear of the wagon, automobile, or the like, and after the engine 2 has been started, the apparatus is drawn between rows of plants. The boll weevils, perforated squares, etc., between the rows will be picked up by the air drawn into the hoods 6 and will be blown into the casing 8 where they will become lodged between the screens 14 and 16, the air and dust passing out through the screens and the flue 9. The heavy material will gravitate onto the rotating rolls and be crushed thereby, the crushed material dropping to the ground.

Importance is attached to the fact that the apparatus is complete in itself and can be applied to any suitable supporting structure.

What is claimed is:—

A machine of the class described including a frame for engagement with a portable supporting structure, a housing mounted on the frame at one end and opening downwardly therethrough, a cover hingedly mounted on the housing and having an upwardly extending stack, a screen hopper within the housing and having its walls converging downwardly to an outlet, screens hingedly connected to the upper ends of said walls of the said hopper and secured together under the stack, the said screens and hopper walls extending throughout the width of the housing, crushing rolls below the hopper for receiving material discharged through the hopper outlet, said rolls being adapted to direct such material downwardly onto the ground, a blower on the frame at the other end thereof, means for directing a current of air from the blower and into each side of the housing into the space below the screens and between the walls of the hopper, suction hoods adapted to be supported close to the ground, flue connections between said hoods and the blower, a motor mounted on the frame, and means for transmitting motion from the motor to the blower and to the rolls simultaneously.

In testimony that I claim the foregoing as my own, I have hereto affixed my signature in the presence of two witnesses.

OSCAR VAN RIPER.

Witnesses:
H. J. TRIMBLE,
TY. WILLIAMS.

Copies of this patent may be obtained for five cents each, by addressing the "Commissioner of Patents, Washington, D. C."